United States Patent [19]
Hale et al.

[11] Patent Number: 5,358,049
[45] Date of Patent: Oct. 25, 1994

[54] CONVERSION OF EMULSION MUD TO CEMENT

[75] Inventors: Arthur H. Hale, Houston; Kenneth M. Cowan, Sugar Land; James J. W. Nahm, Houston, all of Tex.

[73] Assignee: Shell Oil Company, Houston, Tex.

[21] Appl. No.: 195,896

[22] Filed: Feb. 14, 1994

Related U.S. Application Data

[63] Continuation of Ser. No. 964,978, Oct. 22, 1992, abandoned.

[51] Int. Cl.$^5$ .............................................. E21B 33/14
[52] U.S. Cl. ..................................... 166/293; 166/292; 175/65; 507/140
[58] Field of Search .................. 166/292, 293; 175/64, 175/65, 66; 507/140

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ................................. 210/751 |
| 4,643,617 | 2/1987 | Kanno et al. ........................ 405/222 |
| 4,664,843 | 5/1987 | Burba, III et al. . |
| 4,668,128 | 5/1987 | Hartley et al. . |
| 4,674,574 | 6/1987 | Savoly et al. ........................ 166/293 |
| 4,690,589 | 9/1987 | Owa ...................................... 405/263 |
| 4,692,065 | 9/1987 | Suzuki et al. ........................ 405/211 |
| 4,720,214 | 1/1988 | Brasted et al. . |
| 4,746,245 | 5/1988 | Mork ..................................... 405/224 |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |

(List continued on next page.)

FOREIGN PATENT DOCUMENTS

| | | |
|---|---|---|
| 85-144069/24 | 7/1983 | Japan . |
| 61-48454 | 3/1986 | Japan . |
| 883-704 | 6/1981 | U.S.S.R. . |

OTHER PUBLICATIONS

"Deep Cement Mixing Experience in Japan", by G. Dennis et al, Copyright 1985 Seabed Strengthening (List continued on next page.)

*Primary Examiner*—George A. Suchfield

[57] ABSTRACT

A wellbore is drilled utilizing an oil-in-water emulsion drilling fluid, optionally containing blast furnace slag. A compatible cementitious slurry containing blast furnace slag and an activator system is then introduced into the borehole and displaced up into an annulus. Generally, the cementitious slurry is prepared by adding additional blast furnace slag and an activator such as a sodium hydroxide/sodium carbonate mixture to the used drilling fluid.

15 Claims, No Drawings

U.S. PATENT DOCUMENTS

| | | |
|---|---|---|
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ......................... 166/293 |
| 5,026,215 | 6/1991 | Clarke . |
| 5,058,679 | 10/1991 | Hale et al. . |
| 5,082,499 | 1/1992 | Shen ...................................... 106/735 |
| 5,085,282 | 2/1982 | Hale et al. ......................... 175/65 X |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ................... 106/811 |
| 5,147,565 | 9/1992 | Bour et al. ......................... 252/8.551 |

OTHER PUBLICATIONS

Symposium, Denver, Colo., Jun. 4, 1985, TP 85-5.

"Mud Disposal: An Industry Perspective", Hanson et al, Drilling, May 1986, pp. 16–21.

"Waste Minimization Program Can Reduce Drilling Costs", Hall et al., Oryx Energy Co., Houston, Tex., Oil & Gas Journal, Jul. 1, 1991, pp. 43–46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992) by Cowan et al.

"Quantitative Interpretation of X-Ray Diffraction Patterns of Mixtures.I.Matrix–Flushing Method for Quantitative Multicomponent Analysis" by Frank H. Chung, J.App.Cryst. (1974) 7, pp. 519–525.

CONVERSION OF EMULSION MUD TO CEMENT

This is a continuation of application Ser. No. 946,978 filed Oct. 22, 1992, now abandoned.

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a drilling fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to fill the annulus between the casing and the borehole wall or between the liner and casing with a material which will seal the annulus and provide structural support for the casing or liner. This is commonly referred to as primary cementing.

In order to obtain a good cementing job, it is necessary for the cement slurry to displace substantially all of the drilling mud from the annulus. A reduced displacement efficiency arises from the fact that drilling fluids and cements are usually incompatible.

Non-displaced mud (mud still left in the borehole after cementing) and mud filter cake are major causes of unsatisfactory cement performance. Since the non-displaced mud and mud filter cake do not set or bond to the casing, the borehole wall or the set cement itself, the mud and filter cake do not support the casing properly and later can allow annular gas or liquid migration.

Wells frequently are drilled with water-base muds which contain oil as the internal emulsified phase. These muds are generally referred to as emulsion muds or emulsion drilling fluids. These emulsion muds are used, for example, to lower drilling torque and drag, and to prevent bit balling. The presence of the oil in the wellbore, however, can even further reduce the displacement efficiency and subsequent cementing with a conventional water-base Portland cement slurry.

The drilling industry has sought to overcome the above problems by using a variety of techniques to displace the drilling fluid with cement, e.g., turbulent flow, casing movement (reciprocation/rotation), casing equipment (centralizers, flow diverters, mud cake scratchers), and special spacers and wash fluids, but these have had limited success. When a good cementing job is not obtained, it may be necessary to perforate the casing and squeeze cement under high pressure through the perforations into the annulus and try to fill the zones that were not properly cemented initially. Frequently, this squeeze cementing is not successful, and such failures may eventually lead to abandoning the hole.

One of the major objectives of a primary cementing is to obtain good zonal isolation in the annulus of the well. Effective zonal isolation is achieved by sealing the cement and borehole wall. The interface of the cement and borehole wall is usually an interface between the cement and drilling fluid filter cake which is the source of many cementing problems. Good zonal isolation can only be achieved if the filter cake hardens, permanently bonds to the formation face and the cement, and provides hydraulic sealing.

Cementing of the annulus between an oil well casing and the surrounding borehole has been practiced for over 90 years. Long ago, it was recognized that it would be advantageous to solidify drilling fluid in the annulus so as to reduce the cost of the cementing of the casings. Over the decades, various attempts have been made along this line as evidenced by the disclosures in Williams et al., U.S. Pat. No. 2,649,160 (Aug. 18, 1953), and Miller et al, U.S. Pat. No. 3,887,009 (Jun. 3, 1975). However, such techniques, while presumably operable, have failed to achieve commercialization even after the passage of many years. Another attempt in this direction is described in Wyant et al., U.S. Pat. No. 3,499,491 (Mar. 10, 1970), wherein Portland cement is used in an aqueous drilling fluid to produce a mud concrete. Portland cement, however, is very sensitive to the water/solids ratio. Even under ideal conditions, only small increases in the amount of solids results in a very viscous mass. On the other hand, only a slight decrease in the amount of solids results in a composition which sets up to give a very weak structure. These problems are amplified when attempting to use Portland cement in a drilling mud. Thus, while this technique has been used commercially, it has serious drawbacks.

Slag, broadly, as a cementitious material is shown in Tragessar, U.S. Pat. No. 3,557,876 (Jan. 26, 1971).

SUMMARY OF THE INVENTION

It is an object of this invention to achieve the benefits of the presence of oil in an emulsion mud during drilling without the negative influence of oil on subsequent cementing;

It is a further object of this invention to avoid compatibility problems between drilling fluids and cementitious slurries used for wellbore cementing;

It is a further object of this invention to provide a method for drilling and cementing which gives a good bond between the wellbore and casing;

It is a further object of this invention to provide method for in-situ solidification of emulsion muds; and It is yet a further object of this invention to provide a universal fluid filter cake which can be solidified.

In accordance with this invention a borehole is drilled utilizing an oil in water emulsion drilling fluid thus producing a used drilling fluid; thereafter a cementitious slurry comprising blast furnace slag is used in a cementing operation in the wellbore. In another embodiment, the drilling fluid contains blast furnace slag.

DETAILED DESCRIPTION OF THE INVENTION

In accordance with the invention the benefits of the oil in an emulsion drilling fluid are realized with improved, not deteriorated cementing integrity.

Definitions

As used herein, the term 'drilling fluid' means water-based fluid which also contains at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The term 'cementitious material' means blast furnace slag, i.e., a material which, on contact with water and/or activators, hardens or sets into a solidified composition.

The term 'emulsion mud' means a water-based drilling fluid containing oil wherein oil is the internal phase and water is the external or continuous phase. The term oil includes mineral oil, diesel oil, crude oil, synthetic oil, petroleum oil, vegetable oil or esters of vegetable and mineral oils. The esters may include nonionic or ionic detergents.

A slurry of this cementitious material and the component or components which cause it to harden is referred to herein as a 'cementitious slurry'.

The term 'universal fluid' is used herein to designate those emulsion mud compositions containing blast furnace slag, which compositions are suitable for use as a drilling fluid, and which compositions thereafter, for the purpose of practicing this invention, have additional blast furnace slag and/or activators such as accelerators added to give a cementitious slurry.

The term 'pipe' means either a casing or a liner.

The term 'primary cementing' refers to any cementing operation wherein a cementitious slurry is passed into an annulus surrounding a pipe and thus encompasses both the cementing of casings wherein the annulus is between the casing and the borehole wall and the cementing of liners where the annulus is between the liner and the casing.

Drilling Fluid

The drilling can be carried out using a conventional emulsion drilling fluid or by utilizing a universal fluid as described herein.

Generally, in the universal fluid embodiment, the starting material to which the cementitious material (blast furnace slag) is added to give the universal drilling fluid used in this invention is a conventional drilling fluid.

It is sometimes desired that the drilling fluids contain dissolved salts, particularly sodium chloride. In these instances, 0.1 to 26 wt%, preferably 3 to 10 wt% sodium chloride may be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KCl, $CaCl_2$, $NANO_3$, $NaC_2H_3O_2$, $KC_2H_3O_2$, $NaCHO_2$ and $KCHO_2$ among which sodium chloride is preferred, as noted above. These salts can be used, if desired, up to the saturation point under the conditions employed.

A typical mud formulation to which cementitious material may be added to form a universal drilling fluid is as follows: 10-20 wt% salt, 8-10 lbs/bbl bentonite, 4-6 lbs/bbl carboxymethyl starch (fluid loss preventor), sold under the trade name "BIOLOSE" by Milpark Drilling Fluids, 0.5-1 lbs/bbl partially hydrolyzed polyacrylamide (PHPA) which is a shale stabilizer, sold under the trade name "NEWDRIL" by Milpark Drilling Fluids, 1-1.25 lbs/bbl CMC sold under the trade name "MILPAC" by Milpark Drilling Fluids, 30-70 lbs/bbl drill solids, 0-250 lbs/bbl barite, and 0.1-10 volume percent.

The oil is generally present in the drilling fluid ill an amount within the range of 0.1 to 10, preferably 1.5 to 7, more preferably, 2 to 7 volume percent based on the total volume of drilling fluid.

Thus, the universal fluid makes possible a method for drilling and cementing a well comprising preparing a universal fluid by mixing an emulsion drilling fluid and blast furnace slag; drilling a borehole with the universal fluid and laying down a settable filter cake on the walls of the borehole during drilling of the well; adding additional blast furnace slag and/or activators and introducing the thus-formed cementitious slurry into the wellbore and into an annulus surrounding a pipe where it hardens and sets up forming a good bond with the filter cake which filter cake, by itself, actually hardens with time because of the presence of cementitious material therein. This hardening is facilitated by any accelerators which may be present in the cementitious slurry and which migrate by diffusion and/or filtration into the filter cake.

Because the drilling fluid becomes a part of the final cementitious slurry, the amount of used drilling fluid which must be disposed of is greatly diminished.

In another embodiment of this invention, most or all of the components of the drilling fluid are chosen such that they have a function in the cementitious material also. The following Table illustrates the uniqueness of such formulations.

TABLE A

| | Function | | | |
|---|---|---|---|---|
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density | Solids |
| Bentonite[6] | Fluid loss control | — | Fluid loss control | Solids |
| Clay/Quartz dust[7] | — | — | Solids | — |

TABLE A-continued

| | Function | | | |
|---|---|---|---|---|
| | Drilling Fluid | | Cementitious Slurry | |
| Additive | Primary | Secondary | Primary | Secondary |
| Slag[8] | Cuttings stabilizer | — | Cementitious | Solids |
| Lime[9] | Shale stabilizer | Alkalinity | Accelerator | Solids |
| PECP polyalcohol | Cuttings/ Wellbore stabilizer | Fluid loss | Retarder | Rheological Control |
| NaCl | Shale stabilizer | — | — | — |
| Oil | Lubricant | Anti-balling | — | — |

[1] A synthetic polymer manufactured by SKW Chemicals Inc. under the trade name "POLYDRILL", for instance.
[2] Starch made by Milpark Inc. under the trade name "PERMALOSE", for instance.
[3] "BIOZAN", a biopolymer made by Kelco Oil Field Group, Inc., for instance. This is a welan gum and is described in U.S. Pat. No. 4,342,866.
[4] A water-soluble carbohydrate polymer manufactured by Grain Processing Co. under trade name "MOR-REX", for instance.
[5] Barite is $BaSO_4$, a drilling fluid weighting agent.
[6] Bentonite is clay or colloidal clay thickening agent.
[7] A clay/quartz solid dust manufactured by MilWhite Corp. under the trade name "REVDUST", for instance.
[8] Blast furnace slag manufactured by Blue Circle Cement Co. under the trade name "NEWCEM" is suitable.
[9] CaO Blast Furnace Slag The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; and manganese oxides, <0.1.

Blast furnace slag having relatively small particle size is frequently desirable because of the greater strength it imparts in many instances to a final cement. Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area in the 7,000 to 10,000 $cm^2/g$ range that correspond to particles of 5.5–16 microns in size and "ultrafine" can be used to describe particles with a Blaine specific surface area over 10,000 $cm^2/g$ that correspond to particles 5.5 microns and smaller in size. Small particle size blast furnace slags are available from Blue Circle Cement Co., Koch Minerals, Wichita, Kans., under the trade name "WELL-CEM", and from Geochem under the trade name "MICROFINE MC100".

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt% would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt% of the slag, would need to be ground to the ultrafine particle size. Generally, 5 to 25 wt%, more preferably 5 to 10 wt% can be ground to the ultrafine particle size and the remainder ground in a normal way thus giving particles generally in a size range of greater than 11 microns, the majority being in the 11 to 31 micron range.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry.

The preferred sequence for universal fluid in this embodiment of the invention is to prepare the drilling fluid containing a portion of the total slag to be utilized, carry out the drilling operation, dilute the fluid, add the remainder of the slag, add the activator and utilize the cement for its intended purpose such as cementing a casing.

Dilution

Generally, the used universal fluid will be diluted and more blast furnace slag added as well as the activator when the cementitious slurry is formed. Dilution of the drilling fluid is usually needed for control of the density and rheology of the final cementitious slurry. The amount of dilution can vary widely depending on the desired application. Generally, the fluid will be diluted with from 5 to 200%, preferably 5 to 100%, more preferably 5 to 50% by volume (water in the case of a water-based fluid) per volume of initial drilling fluid. In one particularly preferred embodiment, the dilution is such that on addition of the cementitious component (or in the case of the universal fluid addition of the remaining cementitious component) the final density will be within the range of 30% less to 70% more than the original density, preferably within the range of 15% less to 50% more, most preferably, essentially the same, i.e., varying by no more than ±5 wt%. This is particularly valuable in an operation where there is a small difference between the pressure needed to prevent blowout and the pressure which would rupture or fracture the formation through which drilling has taken place.

The dilution fluid can be the same or different from that used to make the drilling fluid initially. In the case of brine-containing fluids the dilution fluid will generally be brine also. This is of particular benefit in offshore drilling operations where fresh water is not readily available but seawater is abundant.

Preferably, the dilution is carried out "on the fly" by adding dilution fluid to a flowing stream of the used drilling fluid and thereafter adding the additional ingredients.

In some instances it is desirable to sequence the incorporation of ingredients into the drilling fluid. For instance, it may be desirable to introduce and mix thinners and/or retarders and activators and thereafter introduce the slag. This is particularly true if mixed metal hydroxides are used in the drilling fluid to impart thixotropic properties. The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1-20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 1.5 lbs/bbl, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula $$Li_mD_dT(OH)_{(m+2d+3+na)}A'_a^n$$

where
M represents the number of Li ions present; the said amount being in the range of zero to about 1;
D represents divalent metals ions; with
d representing the amount of D ions in the range of zero to about 4;
T represents trivalent metal ions;
A' represents monovalent or polyvalent anions of valence −n, other than OH−, with a being the amount of A' anions; and
where (m+2d+3+na) is equal to or greater than 3.

A more detailed description can be found in Burba, U.S. Pat. No. 4,664,843 (May 12, 1987).

The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. However, one of the advantages of this invention is that it reduces or eliminates the need for additives to control free water or solids suspension. The activator or activators can be added either before or after the addition of the additional blast furnace slag.

In some instances, it may be desirable to use a material for a particular effect along with the activator even though it may also act as a retarder. For instance, a chromium lignosulfonate may be used as a thinner along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

The amount of slag present in the universal fluid is generally within the range of 1 to 100 lbs/bbl of final drilling fluid, preferably 10 to 80 lbs/bbl, most preferably 20 to 50 lbs/bbl.

The total amount of cementitious material in the cementitious slurry will typically range from about 20 lbs/bbl to about 600 lbs/bbl, preferably 100 lbs/bbl to 500 lbs/bbl, most preferably 150 lbs/bbl to 350 lbs/bbl.

Conventional Drilling Fluid Additives

Conventional additives which can be added include accelerators, retarders, and other known components of cementitious materials.

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include ionic and nonionic detergents and the oil used to mole the emulsion drilling fluid (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

Filter Cake Setting

In yet another embodiment of this invention the drilling process is carried as described hereinabove with a universal fluid to produce a borehole through a plurality of strata thus laying down a filter cake. Prior to the cementing operation an activator is passed into contact with the filter cake, for instance by circulating the activator down the drill string and up the annulus between the drill string and the filter cake, or else the drill string is removed and the casing inserted and the activator circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drill string is removed, and the cementing carried out as described hereinabove. This can be accomplished by circulating a separate fluid containing the activator or by adding an activator such as an alkali as described hereinabove to the drilling fluid.

Conventional spacers may be used in the above described sequence. Also, any left over fluid having activators therein may be displaced out of the borehole by the next fluid and/or a spacer fluid and stored for subsequent use or disposal.

Cementing can be done in accordance with this invention without spacers or the plugs normally used. The cement cementitious slurry can be displaced by direct contact with a displacement fluid such as seawater.

In this embodiment where the filter cake is "set", the activator can be any of the alkaline activators referred to hereinabove such as a mixture of sodium hydroxide and sodium carbonate.

EXAMPLES

Example 1

| Salt/Lime/Polyalcohol Drilling Fluids | Formulation 1 | Formulation 2 |
|---|---|---|
| Seawater/NaCl (90%/10%) (mls) | 263.8 | 263.8 |
| Bentonite[1] | 20.0 | 20.0 |
| "REV DUST"[2]; (gm) | 25.0 | 25.0 |
| "MOR-REX[3]"; (gm) | 1.5 | 1.5 |
| Lime (qm) | 4.0 | 4.0 |
| Barite[4] (gm) | 158.6 | 158.6 |
| "BIOZAN[5]" (gm) | 1.5 | 1.5 |
| "PERMALOSE"[6] (gm) | 6.0 | 6.0 |
| "POLYDILL"[7] (gm) | 6.0 | 6.0 |
| Polyalcohol[8] (gm) | 36.9 | 36.9 |
| Mineral oil % v/v | — | 3.0 |
| Plastic Viscosity (cp) | 40 | 43 |
| Yield Point (lb/100 ft 2) | 25 | 24 |
| 10 Minute Gel (lb/100 ft 2) | 11 | 12 |
| First Cement Formulation | | |
| "NEWCEM" (lb/bbl)[9] | 200.0 | 200.0 |
| 5 lb/bbl KOH and 5 lb/bbl Sodium Carbonate | | |
| Uniaxial Compressive Strength (psi) after 48 hours at 150° F. | 1120 | 1134 |
| Second Cement Formulation | | |
| "NEWCEM" (lb/bbl) | 50.0 | 50.0 |
| 5 lb/bbl KOH and 5 lb/bbl Sodium Carbonate | | |
| Uniaxial Compressive Strength (psi) after 48 hours at °F. | 125 | 118 |

[1]Bentonite is clay or colloidal clay thickening agent.
[2]"REV DUST" is a trade name for clay/quartz solid dust manufacturing by Milwhite Corp.
[3]"MOR-REX" is a trade name for water-soluble carbohydrate polymer manufactured by Grain Processing Company.
[4]Barite is BaSO4 a drilling fluid weight material.
[5]"BIOZAN" is a biopolymer manufactured by Kelco Oil Field Group, Inc.
[6]"PERMALOSE" is a trade name for starch by Milpark, Inc.
[7]"POLYDRILL" is a trade name for synthetic polymer manufactured by SKW Chemicals Inc.
[8]Polyalcohol is PECP.
[9]Blast furnace slag of about 5,500 Blaine specific surface area sold under the trade name "NEWCEM" by Blue Circle Cement Company.

Example 1 shows the presence of the oil to create an emulsion mud has no adverse effect on the mud properties and that on addition of the hydraulic material, blast furnace slag, and the activators, a cement is obtained which has essentially the same compressive strength when made with the emulsion mud as it has with the oil free mud. This is shown at two blast furnace slag levels.

EXAMPLE 2

| 20% NaCl/PHPA mud from field | Formulation 3 | Formulation 4 | Formulation 5 |
|---|---|---|---|
| Mineral Oil (% v/v) | — | — | 3 |
| Plastic Viscosity (cp) | 30 | 35 | 38 |
| Yield Point (lb/100 ft 2) | 10 | 15 | 17 |
| 10 second gel (lb/100 ft 2) | 3 | 4 | 5 |
| 10 minute gel (lb/100 ft 2) | 11 | 8 | 9 |
| "NEWCEM" (lb/bbl) | — | 40.0 | 40.0 |
| HPHT[2] (mls) 200° F. | 12.8 | 16.4 | 15.2 |
| Uniaxial Compressive Strength (psi) 150° F. | 0 | 105 | 96 |

| 20% NaCl/PHPA mud from field | Formulation 3 | Formulation 4 | Formulation 5 |
|---|---|---|---|
| after 28 days | | | |

[1] Trade name for blast furnace slag.
[2] High pressure, high temperature water loss.

These runs show in a different mud the same indication that the presence of the oil to create the emulsion mud does not adversely affect the mud properties. A comparison of formulations 4 and 5 shows that comparable compressive strength is obtained in the cement made using the emulsion mud as compared with that made from the oil free mud. These formulations did not contain an activator and thus set very slowly. Of course, the formulation with no blast furnace slag does not form a cement.

While this invention has been described in detail for the purpose of illustration, it is not to be construed as limited thereby, but is intended to cover all the changes and modifications within the spirit and scope thereof.

What is claimed is:

1. A method for drilling and cementing a well, comprising:
   combining blast furnace slag having a particle size within the range of 2,000 to 15,000 cm$^2$/g with an oil-in-water emulsion drilling fluid, said blast furnace slag being present in an amount within the range of 1 to 100 lbs/bbl of said drilling fluid plus blast furnace slag;
   utilizing said drilling fluid in a well drilling operation to form a borehole to produce a used drilling fluid;
   diluting at least a portion of said used drilling fluid to an extent that on addition of blast furnace slag thereto, the final density of the diluted drilling fluid will be within the range of 30% less to 70% more than the original density;
   combining the additional blast furnace slag and an activator with said used drilling fluid to produce a cementitious slurry;
   disposing a pipe within said borehole;
   passing said cementitious slurry down said pipe; and
   displacing said cementitious slurry up into an annulus surrounding said pipe.

2. A method according to claim 1 wherein said activator is a mixture of sodium hydroxide and sodium carbonate and said displacement fluid comprises seawater.

3. A method according to claim 2 wherein said oil is present in an amount within the range of 2 to 4 volume percent based on the volume of said drilling fluid.

4. A method according to claim 1 wherein said cementitious slurry contains 150 to 350 lbs/bbl of said blast furnace slag.

5. The method of claim 1 wherein the final density of the diluted drilling fluid will be within the range of 15% less to 50% more than the original density.

6. The method of claim 1 wherein the final density of the diluted drilling fluid will be within the range of 5% less to 5% more than the original density.

7. A method for drilling and cementing a well, comprising:
   drilling a wellbore utilizing an oil-in-water emulsion drilling fluid containing seawater, thus producing a used drilling fluid;
   diluting at least a portion of said used drilling fluid to an extent such that on addition of blast furnace slag thereto, the final density of the diluted drilling fluid will be within the range of 30% less to 70% more than the original density,
   combining the blast furnace slag and an activator with a portion of said used drilling fluid to produce a cementitious slurry, said activator being a mixture of sodium hydroxide and sodium carbonate, and wherein 5 to 25 wt% of said blast furnace slag has an ultrafine particle size;
   disposing a pipe within said borehole;
   passing said cementitious slurry down said pipe; and
   displacing said cementitious slurry up into an annulus surrounding said pipe.

8. A method according to claim 7 wherein said water of said drilling fluid contains water with dissolved salts.

9. A method according to claim 8 wherein said water of said drilling fluid is seawater.

10. A method according to claim 7 wherein 5 to 25 wt% of said blast furnace slag has an ultrafine particle size.

11. A method according to claim 7 wherein said oil is present in an amount within the range of 0.1 to 10 volume percent based on the volume of said drilling fluid.

12. A method according to claim 7 wherein said oil is present in amount within the range of 1.5 to 7 volume percent based on the volume of said drilling fluid.

13. A method according to claim 7 wherein said oil is mineral oil and is present in an amount within the range of 2 to 4 volume percent based on the volume of said drilling fluid.

14. The method of claim 7 wherein the final density of the diluted drilling fluid will be within the range of 15% less to 50% more than the original density.

15. The method of claim 7 wherein the final density of the diluted drilling fluid will be within the range of 5% less to 5% more than the original density.

* * * * *